A. & J. MACIUK.
DETACHABLE STANCHION FOR CATTLE.
APPLICATION FILED JAN. 26, 1917.

1,261,144.

Patented Apr. 2, 1918.
3 SHEETS—SHEET 1.

Inventors
Alexander Maciuk
John Maciuk.

By their Attorney
Oscar Geier

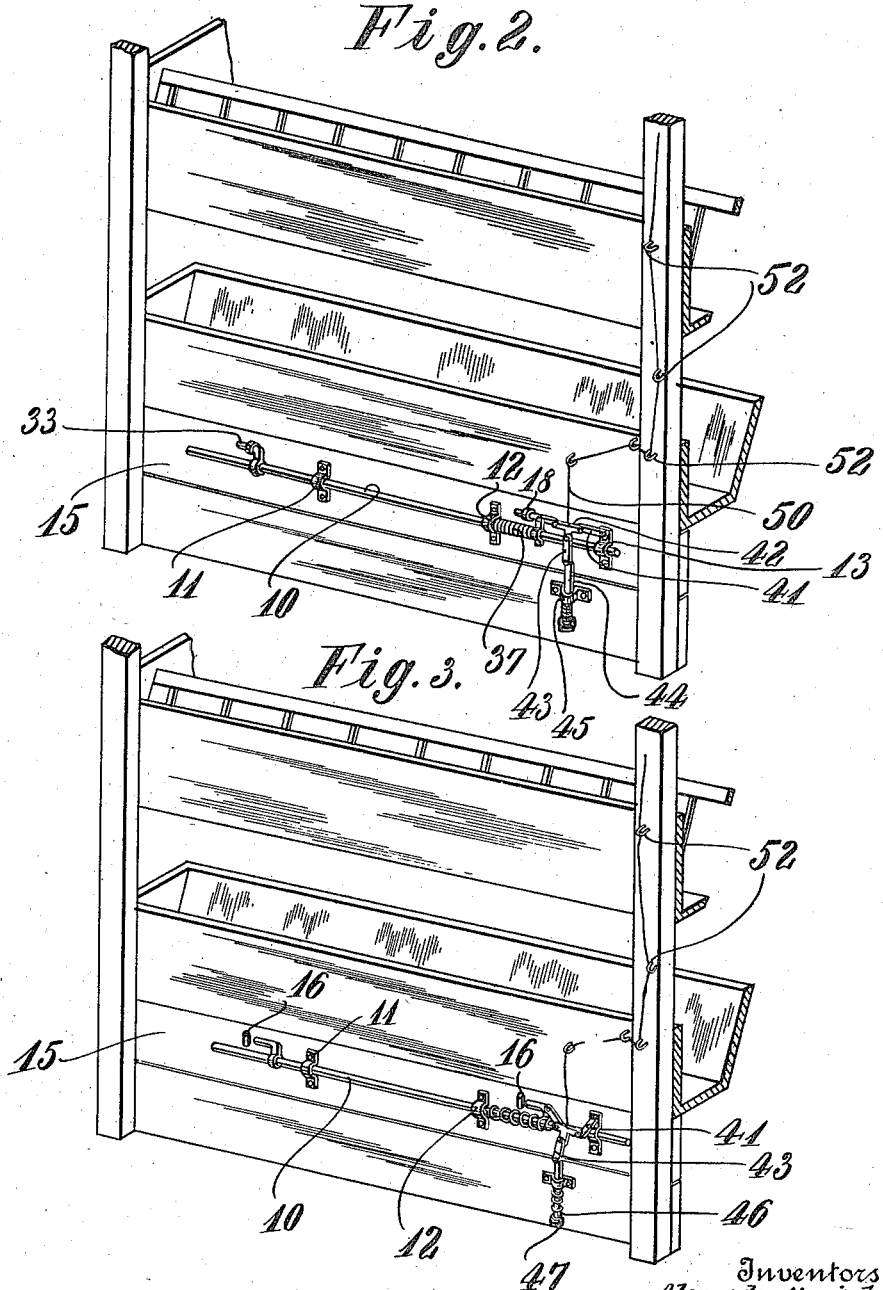

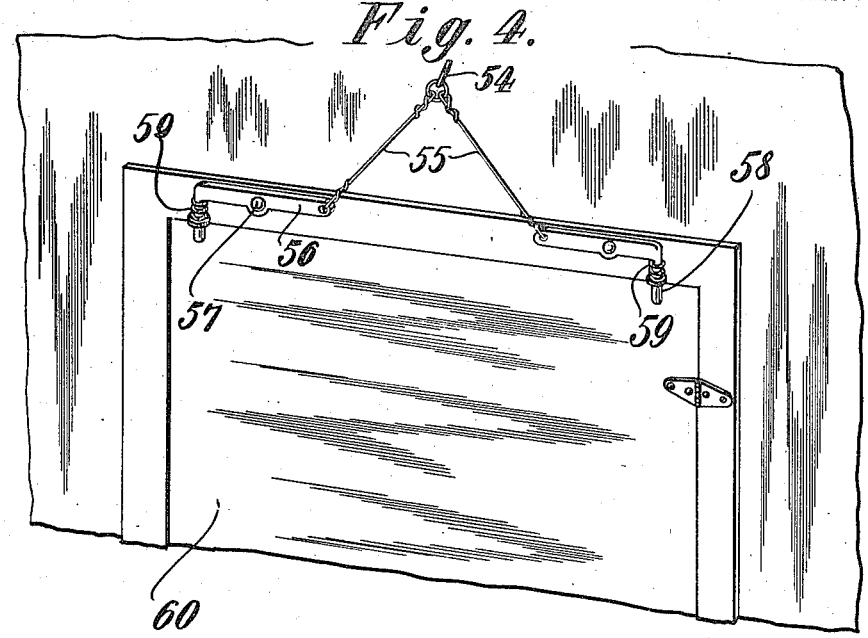
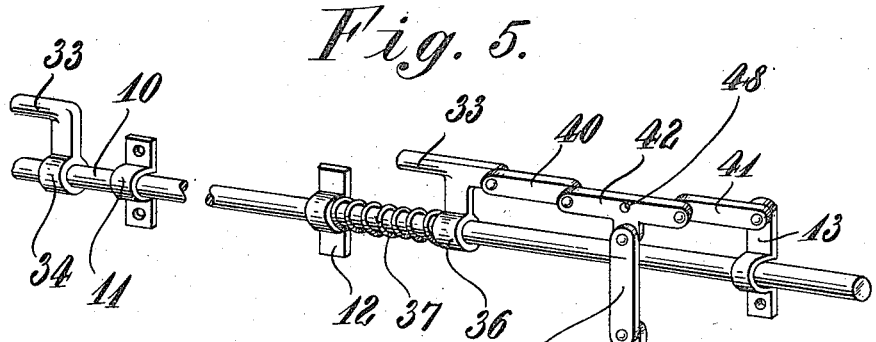
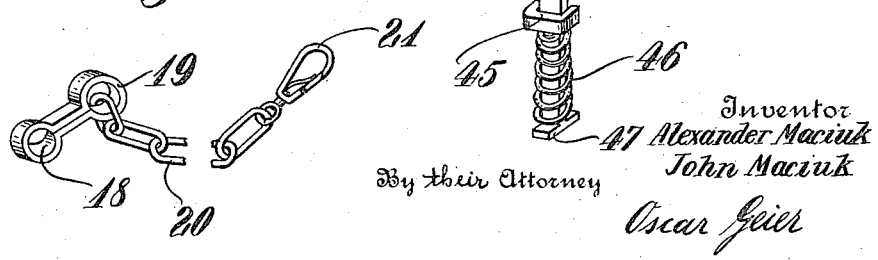

UNITED STATES PATENT OFFICE.

ALEXANDER MACIUK AND JOHN MACIUK, OF PLUMAS, MANITOBA, CANADA.

DETACHABLE STANCHION FOR CATTLE.

1,261,144.        Specification of Letters Patent.        Patented Apr. 2, 1918.

Application filed January 26, 1917. Serial No. 144,657.

*To all whom it may concern:*

Be it known that we, ALEXANDER MACIUK and JOHN MACIUK, subjects of the Emperor of Austria, and residents of Plumas, in the Province of Manitoba, Dominion of Canada, have invented certain new and useful Improvements in Detachable Stanchions for Cattle, of which the following is a specification.

This invention relates to improvements in stables for horses, cattle, and like live stock, and has as its principal object the provision of means whereby should a fire take place that the animals may be automatically released and permitted to escape.

A further object is to provide such means in forms readily applicable to existing structures as well as to new installations, the parts being simple in construction and not readily liable to become disordered.

These and other objects are attained by the novel design, construction and combination of parts hereafter described and shown in the accompanying drawings, forming a material part of this disclosure, and in which:—

Fig. 2 is a perspective view of the feeding crib and animal engaging means, looking from the side opposite to that shown in Fig. 1, and showing the parts in engagement.

Fig. 3 is a similar view to that shown in Fig. 2 but showing the parts in a disengaged position.

Fig. 4 is a partial perspective view showing a stable door securing means.

Fig. 5 is an enlarged perspective view of the animal securing or tethering means, and Fig. 6 is a perspective view of the connections normally existing between the animal's halter and the securing means.

Figure 1:
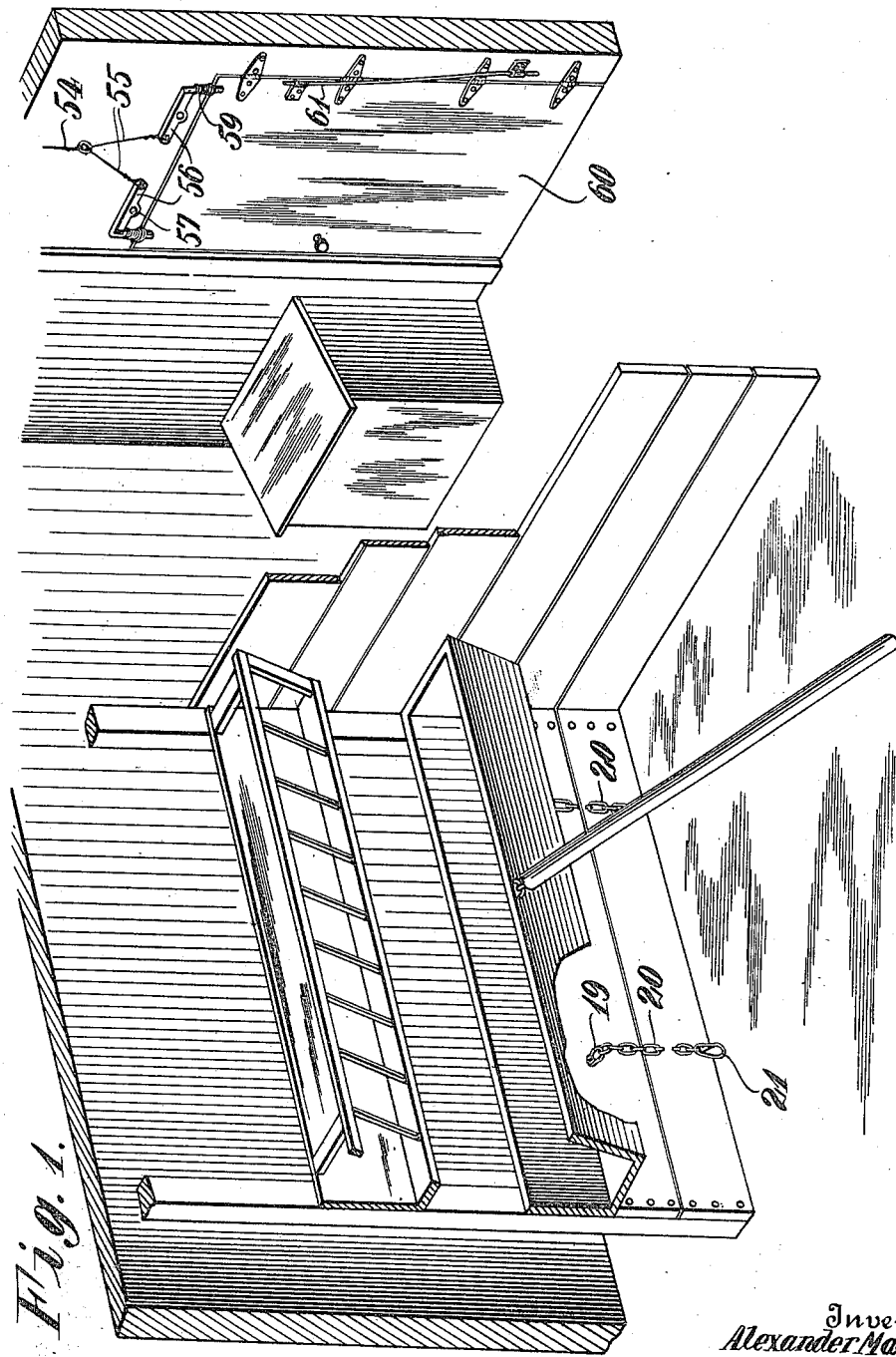
Figure 1 is a perspective view showing the interior of a stable and indicating the application of the invention.

The improvement indicated consists primarily in detachably connecting the animal with reference to the stall in the stable which it occupies, and in the present disclosure consists of a rigid rod or bar 10 slidably engaged in brackets 11, 12 and 13, firmly attached on the side wall of the manger or stall opposite to that occupied by the animal.

Through the side walls 15 are formed openings 16, one for each animal through which may be extended the open link 18, the opposite end 19 being directly engaged with a chain 20 provided with a snap hook 21 or other similar device adapted to be secured to a collar or halter worn by the animal.

When the open link 18 has been passed through the opening 16, it may be engaged by the hooks 33, having hubs 34 rigidly secured to the sliding bar 10, so as to prevent the link from being withdrawn.

One of the hubs, as 36, is adapted to receive the thrust of a coiled helical spring 37, the other end of the spring abutting against the fixed bracket 12 so that the rod is normally forced to one side, that is the direction to release the links 18.

The rod however is normally held forward by reason of a connection comprised of a link 40 engaged with one of the hook elements 33 or other similar element rigidly secured on the bar 10, a similar link 41 being engaged with the outermost bracket 13 and pivotally engaging with the ends of the links 40 and 41 is a T shaped bar 42, connected by a pivot link 43 with a sliding bar 44, movable in a bracket 45 and normally pressed downward by action of the spring 46, the same exerting pressure between the fixed bracket 45 and the enlarged head 47 of the bar 44. Thus the hooks will be held in engagement with the links 18 under normal conditions.

In the center of the T shaped bar 42 is an opening 48 to which is attached a cord 50, the same being guided through a plurality of loops 52 extending alongside the partition or vertical supported elements to some convenient point of attachment.

This cord is comprised of an inflammable material which, should a fire take place, will become burned allowing the spring 46 to operate, releasing the T shaped bar 42 and through its connections, retracting the bolts 33, releasing the links 18 so that the same may be retracted through the openings 16 by the movement of the animal backing outward from the stall or stable.

At the same time, other inflammable cords 54, having branches 55, are attached to levers 56 pivoted at 57 and having a downturned portion 58 pressed normally upward by the springs 59 so that when the cord 54 or 55 is released, as by being burned through, the spring 59 acts to raise the downturned elements or hooks 58, releasing the door 60 which is opened outwardly automatically by reason of the spring 61, thus providing means for the exit of the animals.

Having thus described our invention, what we claim as new and desire to secure by Letters Patent is:—

In a stable, the combination with the front walls thereof, of devices attachable to animals, elements combined with said attaching devices extending through apertures in the walls of the stable, hooks engageable with said elements, a slidable bar upon which said hooks are rigidly engaged, a link connection engaged with said slidable bar at one end and with a fixed element at the other, means for holding said link connection in such manner as to maintain said hooks engaged with said elements, said means being of a rupturable material, and means for retracting said bar co-incidently with the rupture of said holding means.

In testimony whereof we have affixed our signatures this 24th day of November, 1916.

ALEXANDER MACIUK.
JOHN MACIUK.

Copies of this patent may be obtained for five cents each, by addressing the "Commissioner of Patents, Washington, D. C."